United States Patent [19]

Gould et al.

[11] 4,156,968
[45] Jun. 5, 1979

[54] GEM COOKIE CUTTER

[76] Inventors: Mary J. Gould; James O. Gould, both of 10891 Blatt Rd., North Jackson, Ohio 44451

[21] Appl. No.: 921,958

[22] Filed: Jul. 5, 1978

[51] Int. Cl.² .............................................. B26B 3/00
[52] U.S. Cl. ................................................... 30/307
[58] Field of Search ........................ 30/307, 306, 292

[56] References Cited

U.S. PATENT DOCUMENTS

| | | | |
|---|---|---|---|
| 440,879 | 11/1890 | Jackson | 30/292 |
| 797,088 | 8/1905 | Tobler | 30/292 |
| 1,416,106 | 5/1922 | McWhorter | 30/307 |
| 1,800,096 | 4/1931 | Nishimura | 30/292 |
| 2,304,759 | 12/1942 | Carroll | 30/307 |
| 2,684,533 | 7/1954 | Kern | 30/307 X |

FOREIGN PATENT DOCUMENTS 467131  8/1950  Canada ........................................ 30/307

*Primary Examiner*—James L. Jones, Jr.
*Assistant Examiner*—J. T. Zatarga

[57] ABSTRACT

A kitchen implement for cutting up rolled-out dough into strips or squares of equal widths; the implement including a handle unit that incorporates a shaft, upon which two wheels are adjustably positioned, the wheels being rolled across the dough in order to cut the same.

2 Claims, 3 Drawing Figures

U.S. Patent   Jun. 5, 1979   4,156,968
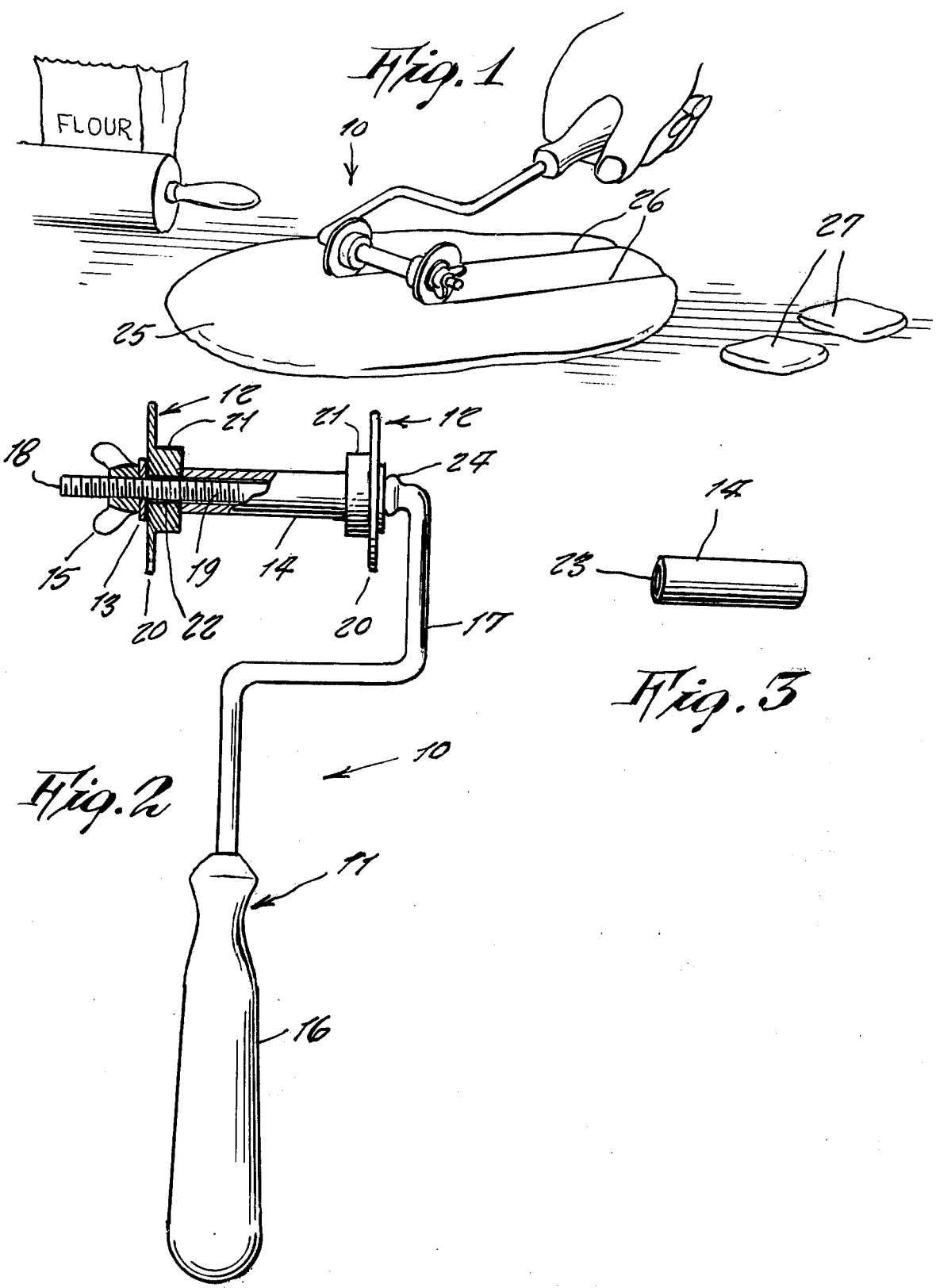

GEM COOKIE CUTTER

This invention relates generally to baking implements.

Heretofore, when a homemaker wished to make cookies or lattice work for a top of a pie, she took a knife and cut a rolled-out dough into strips, but it is difficult to cut strips of equal widths in such a manner, so that the cookies thus came out of different sizes, and the lattice work came out narrower or wider at different parts thereof. This situation is, accordingly, in want of an improvement.

Accordingly, it is a principal object of the present invention to provide a cookie cutter, which easily and quickly cuts up rolled-out dough into cookies of equal sizes, or for making equal widths of strips for a lattice work on top of a pie.

Another object of the present invention is to provide a cookie cutter, which is readily adjustable, so as to cut the dough in widths of either one and one half inch, two inch or two and one quarter inch.

Yet a further object is to provide a cookie cutter wherein the cutter wheels are adjustable in part, by turning around either one or both wheels upon the shaft.

Other objects are to provide a cookie cutter which is simple in design, inexpensive to manufacture, rugged in construction, easy to use and efficient in operation.

These, and other objects, will be readily evident, upon a study of the following specification, and the accompanying drawing, wherein FIG. 1 is a perspective view of the present invention shown in use;
partly in cross-section, and FIG. 2 is a top view of the device, shown partly in cross-section, and FIG. 3 is a perspective view of a spacer sleeve, which comprises a component of the present invention.

Referring now to the drawing in greater detail, the reference numeral 10 represents a gem cookie cutter, according to the present invention, wherein there is an assembly of seven parts, and which include a handle unit 11, a pair of wheels 12, two washers 13, a spacer sleeve 14, and a wing nut 15.

The handle unit 11 includes a handle 16; from one end there extends a configurated shaft 17, that includes a terminal end portion 18, which extends at right angle to a longitudinal axis of the handle 16. The terminal end portion 18 includes a screw thread 19, so that the wing nut 15 may be threadingly engaged thereupon. The handle 16 may be made of wood, and the shaft 17 may be made either of metal or plastic. Ultimately, the handle and the shaft may be molded together, if both are intended to be made of plastic.

Each of the wheels 12 comprises a circular disc 20, of relatively narrow thickness, and which, upon one side thereof has a hub 21. A central opening 22, extending through the wheels, allows the wheels to be fitted slidably upon the terminal end portion 18 of the shaft. Each of the hubs is one-half inch in width.

The spacer sleeve 13 is one and one fourth inch in length, is cylindrical in shape, and includes a central opening 23 extending therethrough, so that it likewise is slidably fitted upon the terminal end portion 18 of the shaft, so as to be positioned between the two wheels.

In assembling the cookie cutter, a washer 13 is first inserted upon the terminal end portion 18 of the shaft, so as to abut against enlarged shoulder 24 of the shaft. Thereafter, one of the wheels 12 is placed against this washer. Thereafter, the spacer is placed against this wheel, and then the second wheel is placed on the shaft, so as to abut against the spacer. The next washer is then placed against the second wheel, and finally the wing nut is then screwed upon the shaft, so as to abut against the second washer. In this position, the cookie cutter is simply rolled across a top of a rolled-out dough 25, so that the two wheels make two spaced-apart cuts 26 across the dough, the cuts being thus equal distance apart throughout their lengths. Thus, by cutting the dough in two different directions, cookies 27 of equal size can thus be produced. By reversing the positions of either one of the wheels, or both of the wheels, the distances between the cuts 26 are adjustable, so as to be either one and one half inch, two inch, or two and one quarter inch, as preferred.

While various changes may be made in the detail construction, it is understood that such changes will be within the spirit and scope of the present invention, as is defined by the appended claims.

What we now claim is:

1. A cookie cutter, comprising, in combination, a handle unit, a pair of spaced-apart wheels fitted on said unit, so that said wheels can be rolled across dough, in order to cut said dough into strips of uniform width; said handle unit including a handle, from one end of which a configurated shaft extends, said shaft including a terminal end portion that extends at right angles to a longitudinal axis of said handle, said terminal end portion being screw-threaded, and engaging a wing nut that retains said wheels upon said terminal end portion of said shaft; a spacer sleeve on said shaft terminal end portion and located between said wheels, and a plain washer positioned adjacent an outer side of said wheels; each said wheel comprising a thin disc and a hub on one side thereof, whereby reverse placement of either or both said wheels on said shaft terminal end portion changes a distance between said discs.

2. The combination as set forth in claim 1, wherein an enlarged shoulder is formed on said terminal end portion, said shoulder retaining one said washer away from a right angle bend formed between said terminal end portion and a remainder of said shaft.

* * * * *